(12) United States Patent
Murray et al.

(10) Patent No.: US 9,554,518 B2
(45) Date of Patent: Jan. 31, 2017

(54) ACTUATION LINKAGE FOR FLEXIBLE CROP RESIDUE MANAGEMENT

(71) Applicant: CNH America LLC, New Holland, PA (US)

(72) Inventors: Craig E. Murray, Davenport, IA (US); Justin L. Montenguise, Bettendorf, IA (US); Nicholas S. Shane, Davenport, IA (US)

(73) Assignee: CNH Industrial America LLC, New Holland, PA (US)

( * ) Notice: Subject to any disclaimer, the term of this patent is extended or adjusted under 35 U.S.C. 154(b) by 618 days.

(21) Appl. No.: 13/934,388

(22) Filed: Jul. 3, 2013

(65) Prior Publication Data

US 2015/0011276 A1 Jan. 8, 2015

(51) Int. Cl.
*A01F 12/30* (2006.01)
*A01F 12/00* (2006.01)
*A01D 41/12* (2006.01)

(52) U.S. Cl.
CPC .......... *A01F 12/00* (2013.01); *A01D 41/1243* (2013.01)

(58) Field of Classification Search
CPC .................. A01D 41/1217; A01D 41/1243
USPC ...... 460/111, 112; 56/320.1, 320.2; 198/671, 198/531, 536, 550.1
See application file for complete search history.

(56) References Cited

U.S. PATENT DOCUMENTS

| | | | |
|---|---|---|---|
| 3,695,015 A | 10/1972 | Twidale et al. | |
| 3,771,297 A | 11/1973 | Jackson | |
| 4,085,570 A | 4/1978 | Joray et al. | |
| 4,362,006 A | 12/1982 | Denzin | |
| 4,628,946 A | 12/1986 | De Busscher et al. | |
| 6,415,590 B1 | 7/2002 | Lohrentz | |
| 6,546,705 B2 | 4/2003 | Scarlett et al. | |
| 6,547,169 B1 | 4/2003 | Matousek et al. | |
| 6,881,145 B2 * | 4/2005 | Holmen | 460/112 |
| 6,908,379 B2 * | 6/2005 | Gryspeerdt et al. | 460/111 |
| 7,220,179 B2 | 5/2007 | Redekop et al. | |
| 2002/0073675 A1 | 6/2002 | Buermann et al. | |
| 2005/0101363 A1 | 5/2005 | Farley et al. | |
| 2007/0084176 A1* | 4/2007 | Chenevert et al. | 56/320.1 |
| 2009/0005137 A1 | 1/2009 | Isaac et al. | |
| 2009/0088231 A1 | 4/2009 | Murray et al. | |
| 2009/0156277 A1 | 6/2009 | Benes et al. | |
| 2010/0291985 A1 | 11/2010 | Pohlmann et al. | |
| 2012/0270613 A1 | 10/2012 | Isaac et al. | |
| 2014/0066147 A1 | 3/2014 | Dilts et al. | |

FOREIGN PATENT DOCUMENTS

WO 2011/083128 A1 7/2011

* cited by examiner

*Primary Examiner* — Thomas B Will
*Assistant Examiner* — Mai Nguyen
(74) *Attorney, Agent, or Firm* — Patrick M. Sheldrake

(57) ABSTRACT

An agricultural harvester with a flexible crop residue management system. A pivotal swath door and displaceable windrow chute are coordinated to be displaced between positions in which all of crop residue is spread laterally and another position in which straw in the crop residue is directed in a windrow by a windrow chute and the chaff is directed laterally. The windrow chute and swath door are each pivotally mounted and a linkage is provided between the windrow chute and swath door in the form of bars extending in between rollers to displace the windrow chute in coordination with the displacement of the swath door.

18 Claims, 7 Drawing Sheets

ACTUATION LINKAGE FOR FLEXIBLE CROP RESIDUE MANAGEMENT

BACKGROUND OF THE INVENTION

1. Field of the Invention

The present invention relates to agricultural harvesters such as combines, and, more particularly, to crop residue systems used in such combines.

2. Description of the Related Art

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed, it falls through perforations in the concaves onto a grain pan. From the grain pan, the grain is cleaned using a cleaning system, and is then transported to a grain tank onboard the combine. A cleaning fan blows air through the sieves to discharge straw, chaff and other debris toward the rear of the combine.

During the process of harvesting, crop material other than grain (MOG) is intended to be expelled from the combine. This material is usually derived from one of two areas, the threshing rotor or the cleaning system. The material expelled from the threshing rotor is generally referred to as straw and the material expelled from the cleaning system is generally referred to as chaff. This crop residue can be dealt with in several ways, generally categorized as spread and windrowed.

Spread refers to using a mechanical device to distribute the straw and/or chaff evenly across the width of the combine header cut width. This spread material is usually chopped to as short a length as possible so that when it is spread it will break down as quickly as possible and not interfere with tillage or seeding operations.

Windrowing refers to the process of dropping straw directly behind the combine in a continuous stream. The purpose of doing this is usually to allow post harvest processing of the straw such as shaping it into bales. In this process, the straw is usually allowed to pass through the combine with as little interference as possible so that it remains as close as possible to its original length and condition.

Many harvester systems have two separate spreading systems, one of which is dedicated to spreading the chaff from the cleaning system and another dedicated to spreading the straw from the rotor. These systems can be operated independent of one another. Currently, in order to windrow straw discharged from the rotor, the spreader disks normally used to spread the crop residue, must be removed from the machine and stored elsewhere since there is little available storage on the combine. Besides having to remove the disks, there is an absence of a device to slow the velocity of the straw before it hits the ground. This causes the straw to be driven into the stubble and makes it very difficult to return and pick up later. While windrowing straw, many operators prefer to spread chaff from the cleaning system which requires the use of a secondary spreader on the machine.

It has been proposed in co-pending application entitled "System for Flexible Crop Residue Management" of common assignment with the present invention to provide the ability to windrow straw and spread chaff. In that application, a windrow chute is displaceable between several positions in coordination with displacement of a swath door for the crop residue stream. The implementation of the coordinated displacement can be difficult and complicated.

Accordingly what is needed in the art is a linkage for a crop residue management system that is simple and effective.

SUMMARY OF THE INVENTION

The present invention provides a linkage for a crop residue management system that provides flexibility in the treatment of the material making up the crop residue.

The invention, in one form, is a crop residue management system for flexible distribution of straw and chaff contained within the crop residue. The system includes a pair of laterally spaced spreader devices for distributing a crop residue laterally. A duct, including a displaceable swath door, directs a crop residue stream to the spreader devices in a downward direction when the swath door is in a lower position. A windrow chute is displaceable between a first position in which the windrow chute is out of the crop residue stream and a second position in which it directs straw in the residue stream in a windrow behind the apparatus and directs chaff laterally. Linkage interconnects the swath door and the windrow chute so that displacement of the swath door to its downward position places the windrow chute out of the crop residue stream and displacement of the swath door to its upper position places positions the windrow chute in the crop residue stream.

In another form, the invention is an agricultural combine including a crop processing apparatus separating crop material from crop residue containing straw and chaff and for discharging crop residue therefrom in a stream. Laterally spaced spreader devices distribute a crop residue laterally. A duct is positioned upstream of the spreader devices and includes a swath door displaceable between two positions, the first of which directs the crop residue stream to the spreader devices in a downward direction toward the laterally spaced spreader devices and a second position in which the swath door is in an upper position. A windrow chute is displaceable between a first position in which the windrow chute is out of the crop residue stream and a second position it which it directs straw in the residue stream in a windrow behind the apparatus and directs chaff laterally. A linkage is provided to interconnect the swath door and the windrow chute so that when the swath door is in the upper position the windrow chute is positioned in the crop stream and when the swath door is in the lower position the windrow chute is out of the stream.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
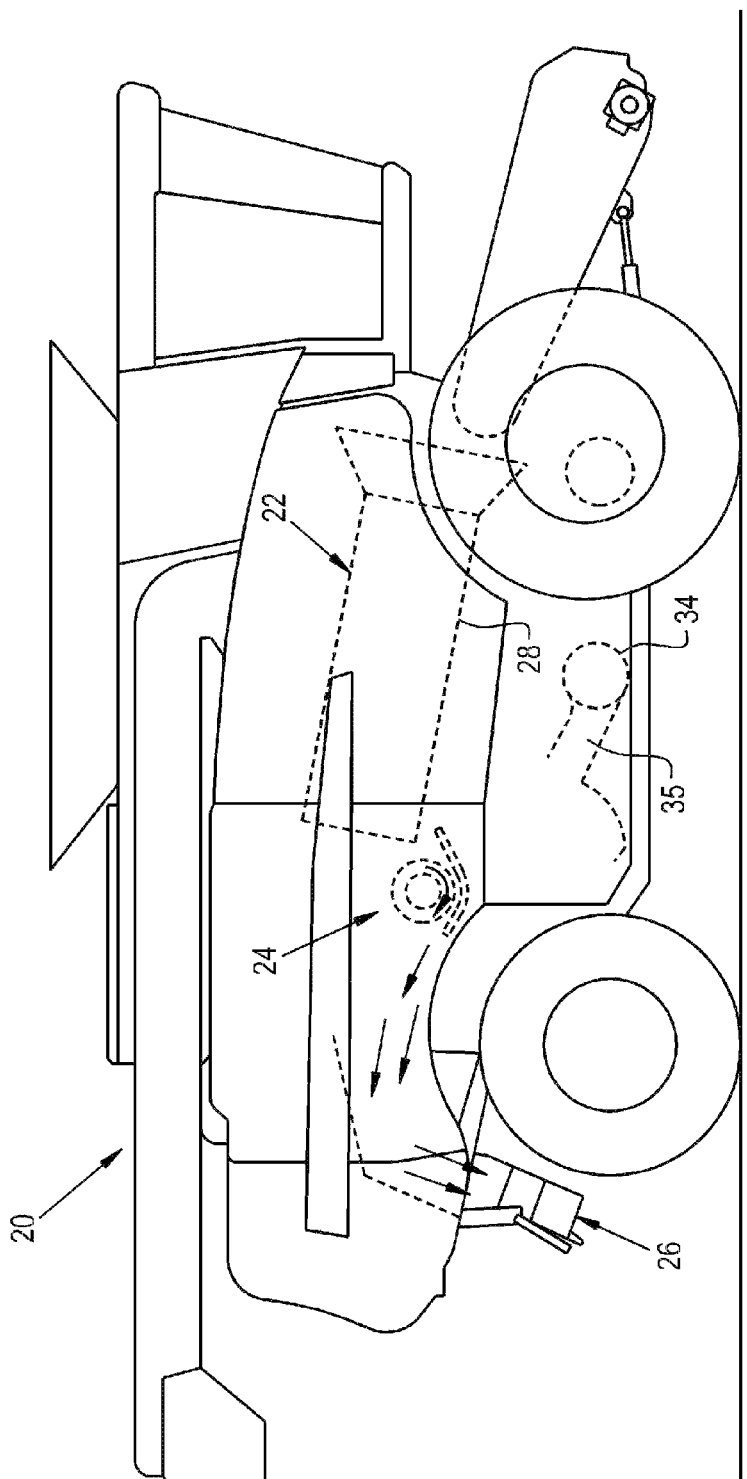
FIG. 1 is a side view of an embodiment of an agricultural harvester in the form of a combine which may include a crop residue system of the present invention.

FIG. 1 shows an agricultural combine 20 which includes the usual harvesting apparatus (not all of which is shown to facilitate an understanding of the invention). An axially oriented crop processing system 22 receives harvested crop and a crop residue treatment and distribution system 24 with a crop residue spreader 26 is positioned at the aft end of combine 20. The crop processing system includes a cylindrical threshing rotor 28 that conveys a flow of crop material in a helical flow path. As the crop material is moved through the processing apparatus 22, the desired crop such as grain or other material is loosened and separated from crop residue such as husk and pods in a cleaning system located beneath the threshing rotor 28. The crop processing system 22 includes a blower 34, schematically depicted to aid in the separation of the desired crop from the crop residue. The blower 34 has a duct 35 extending aft in the combine 20 towards the cleaning system and the crop residue treatment and distribution system 24.

As pointed out, current crop residue spreading systems have required the need of in the field modifications to the harvester or added equipment to enable the flexibility of either distributing all residue laterally or separating the straw into a windrow and spreading the chaff laterally. In accordance with the present invention, the crop residue spreader system 26 shown in FIGS. 2-5 is employed.

Figure 2:
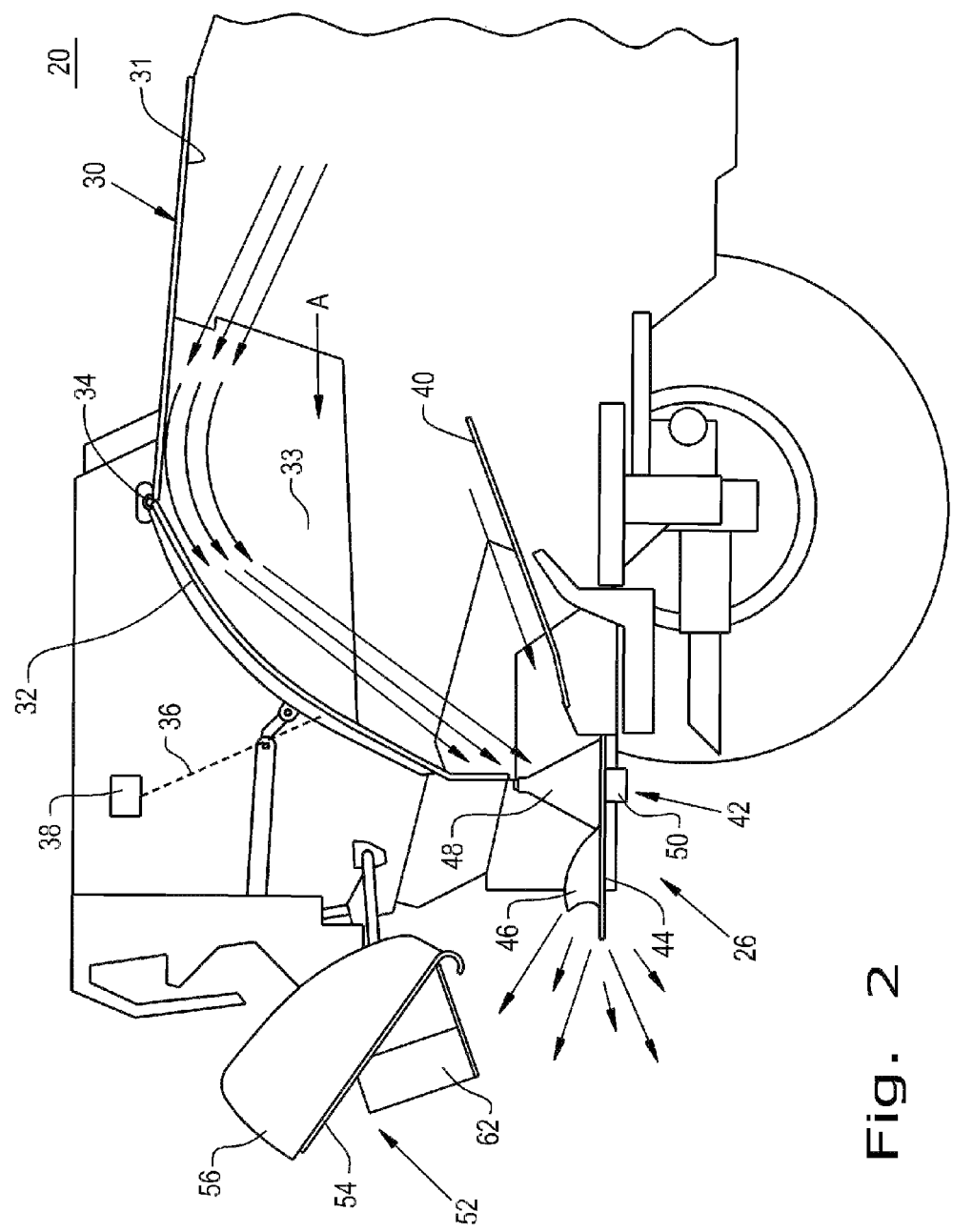
FIG. 2 is a side view in section of the agricultural of the agricultural harvester of FIG. 1 showing a first position in which crop residue is distributed laterally.

Specifically referring to FIG. 2, the crop residue spreader system comprises a duct 30 including a top wall 31 and sidewalls 33 to direct crop residue in an aft direction A. A swath door 32 spans the sidewalls of the duct 30 and is pivotally mounted at 34 to be displaced between the position shown in FIG. 2 to the position shown in FIG. 3. As shown in schematic fashion, the swath door 32 is displaced by a mechanical interconnection 36 to an actuating mechanism 38, both shown in schematic fashion. Many different actuators may be used to displace swath door 32 between its positions. A fixed floor 40 directs the crop residue stream towards a pair of spreader devices 42.

Spreader devices 42 include side-by-side disks 44 journaled for rotation about vertical axis and positioned laterally with respect to one another. Disks 44 may have a plurality of curved bats 46 that act like vanes to positively direct and spread crop residue in a lateral direction. A cone 48 extends vertically upward from disk 44 and provides a cover for a motor 50 for each disk. The motor output shafts (not shown) cause the disks 44 to rotate as needed. Although motor 50 is illustrated as hydraulic, it may be in any one of a number of forms including mechanical interconnection to a remotely positioned motor. Rotation of disks 44 is set up so that when viewed from above and looking towards the front of the combine 20, the right side disk rotates counterclockwise and the left disk rotates clockwise so that they propel crop residue between them aft and around and laterally.

In the position illustrated in FIG. 2, both the straw and chaff are directed aft in the direction A and are deflected downward by swath door 32 to impact on the disks 44 and curved bats 46. The rotation of the disks 44 causes the material to be distributed aft and laterally of the combine 20.

In accordance with the present invention, a windrow chute generally indicated at 52 is provided. Windrow chute includes a bottom portion 54 and adjacent sidewalls 56. Bottom portion 54 is tapered in a rearward direction as particularly shown in FIG. 4. Windrow chute 52 is displaceable between the position illustrated in FIG. 2 in which it is out of the crop residue stream and the position illustrated in FIG. 3. Windrow chute 52 is displaced by a mechanical connection to the swath door 32 as described below. Windrow chute 52 additionally includes deflectors 62 and 64 fixed to and projecting downwardly from bottom portion 54. As particularly shown in FIG. 5, deflectors 62 and 64 are curved to conform to the circumference of horizontal spreader disks 44.

In the positions shown in FIG. 2, the windrow chute 52 is in its upper position in which it is positioned out of the crop residue stream and the swath door 32 is in its first lowered position in which it directs all of the crop residue stream towards the spreading devices 26.

Figure 3:
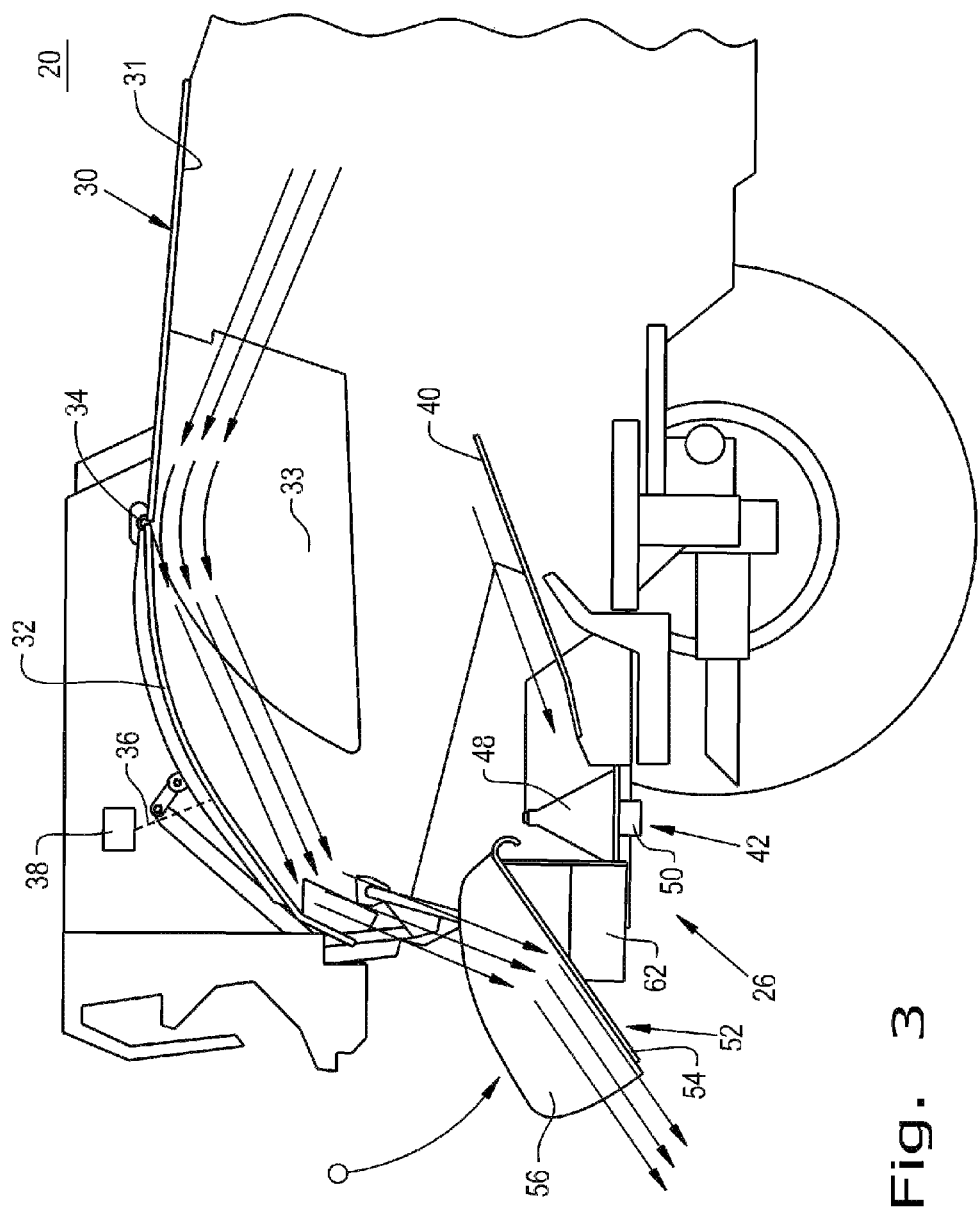
FIG. 3 is a side section view of the harvester of FIG. 1 showing the crop residue in a position for windrowing straw and laterally distributing chaff.
Figure 4:
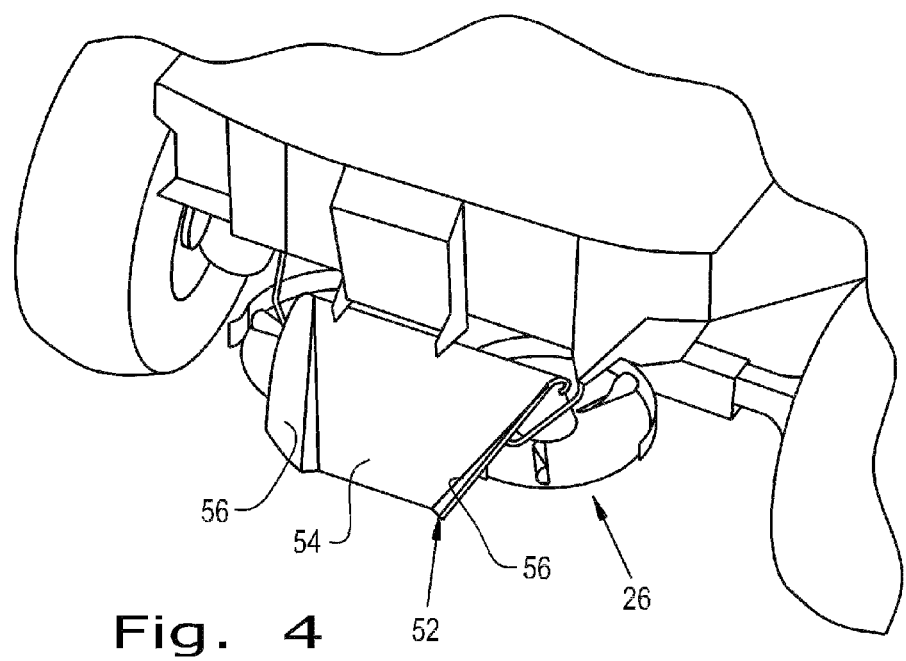
FIG. 4 is a perspective view of the elements of the crop residue management system of FIGS. 2-3 from an upper view.
Figure 5:
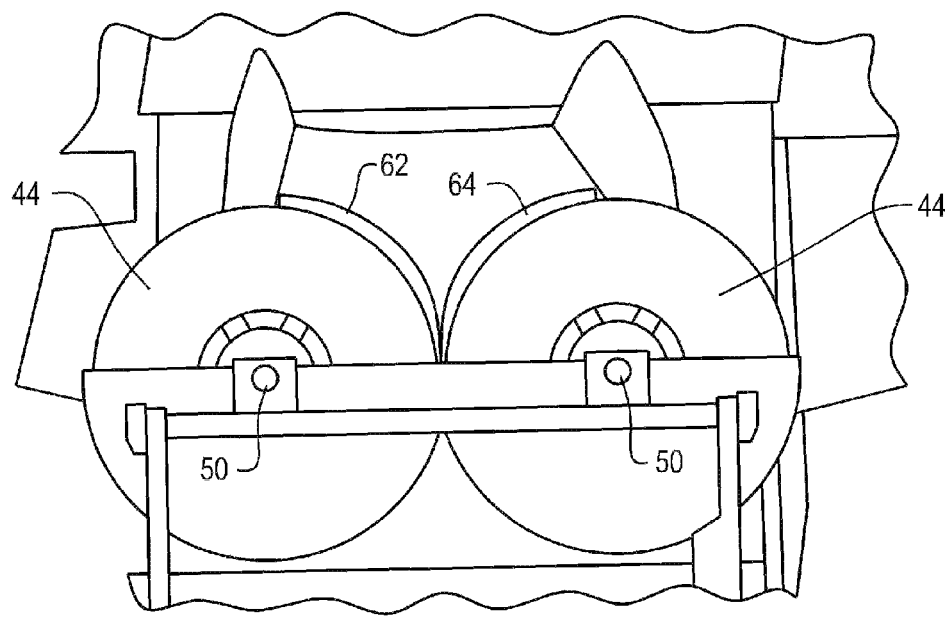
FIG. 5 is a view of the same section of the crop residue management system taken from a lower view.

As shown in FIG. 3, the swath door 32 is displaced by the actuating mechanism 38 to the position in which it is elevated and does not direct all of the crop residue stream towards the spreading devices 26. At the same time, the linkage described below displaces the windrow chute 52 to the illustrated lower position in which it is in the crop residue stream. In the crop residue stream, the straw tends to be elevated and as such is directed downward to the windrow chute 52 and the impact therewith slows the velocity of the straw. In addition, the convergence of the windrow chute enables a better formed windrow of straw which is directed downstream of the combine 20. At the same time, the chaff in the crop residue stream falls to the residue spreader system 26 and the deflectors 62 and 64 keep the air flow from the disks 44 out of the windrow for the straw so that it does not disturb the proper positioning in the field. The chaff in this condition is spread laterally.

Figure 6:
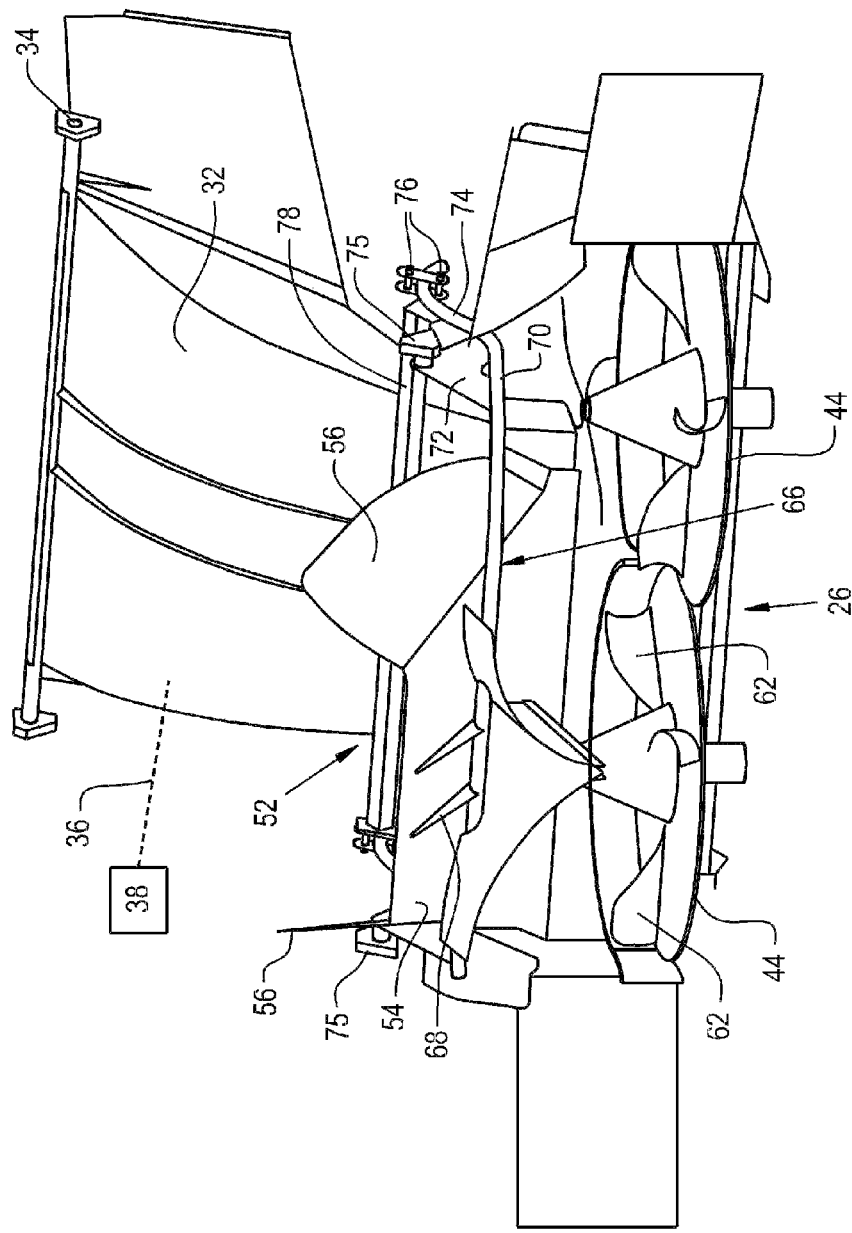
FIG. 6 is a perspective view of the agricultural harvester of FIG. 1 showing a preferred linkage for component actuation.

The linkage illustrated in FIGS. 6-9 is preferred for displacing the windrow chute 52 and swath door 32 between their positions in a coordinated, interdependent fashion. Referring specifically to FIG. 6, the swath door 32 is pivotally mounted to the frame of the combine 20 at 34 and is displaceable around the pivot by the mechanical interconnection 36 with the actuator 38, shown in schematic fashion. It should be noted that a variety of actuators may be employed for this purpose such as electrical, hydraulic and other forms. The windrow chute 52 is mounted by means of a bar assembly 66 extending across the tapered bottom portion 54 and affixed thereto for support including a pair of ribs 68. The bar assembly 66 curves in a U-shaped fashion at 70 and is connected to a plate 72 in turn connected to a pivotal connection 75 that mounts to the chassis of the combine 20. A second plate 73 is pivotally connected to plate 72 at pivotal connection 75. It should be noted that the point of connection between plates 72 and 73 may not necessarily be co-incident with pivotal connection 75. The bar assembly 66 has an extension portion 74 secured to plate 73, and is slightly curved and received between a pair of rollers 76 mounted on a bar 78 secured adjacent the free end of the swath door 32. Thus, the rollers 76 capture the extension portions 74 and cause movement of the swath door 32 between its two positions to pivot the windrow chute 52 between its two positions described above. The pairs of rollers enable the linkage to accommodate the slight differences in effective link as the components are pivoted throughout their range of motion. Duplicate components are maintained on the opposite side so that the windrow chute is mounted for displacement in a pivotal fashion between the positions stated above.

Figure 7:
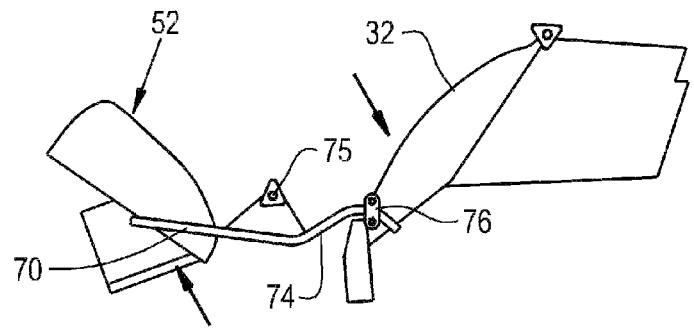
FIGS. 7-9 show the linkage of FIG. 6 in the various operational positions.
Figure 8:
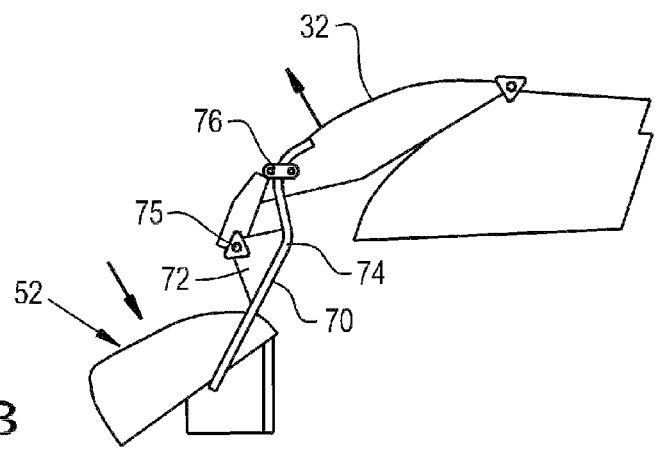
Figure 9:
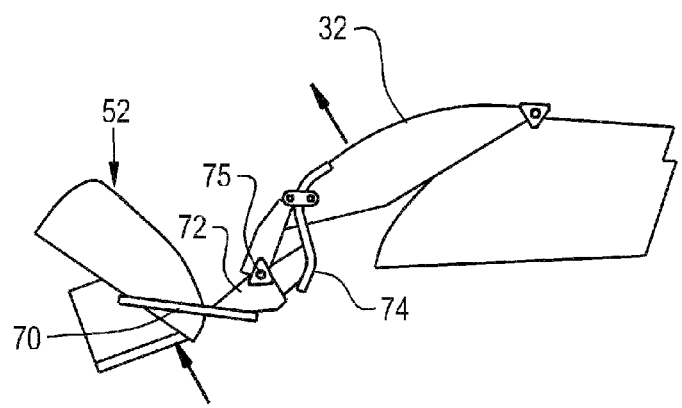
Figure 10:
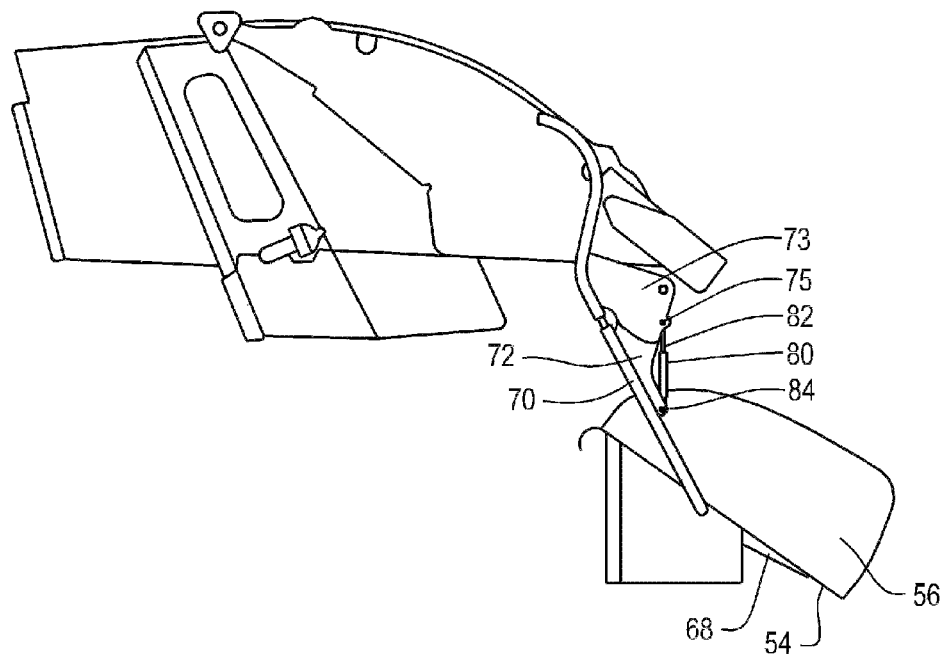
FIG. 10 shows a detail of the linkage of FIGS. 6-9.

The different positions of the windrow chute 52 and the swath door 32 are illustrated in FIGS. 7-9. In FIG. 7 the swath door 32 is pivoted in a downward direction as shown in FIG. 2 and the windrow chute 52 pivoted to its upper position out of the stream. This is done by the action of the rollers 76 urging extension 74 to pivot windrow chute 52. In FIG. 8 the swath door 32 is in its upper position and the windrow chute 52 is in the position in the stream and it can be seen that the rollers 76 urge the bars 74 in a position that swings the windrow chute in a downward position.

FIG. 9 shows the service position in which it is desired to provide maximum access to the crop distribution apparatus 26. In this position, the swath door 32 is displaced to its upper position. A bi-stable strut 80 is connected to plate 73 at 82 and to plate 72 at 84 to normally hold bars 70 and bar extensions 74 in alignment with one another. By retracting strut 80 to its shortened position, plates 72 and 73 are pivoted relative to one another to displace the windrow chute 52 to its upper position. As a result, an operator has maximum access to the components making up the crop distribution device 26. Strut 80 may be in the form of an over center gas strut but other forms may be employed.

The linkage described above is coordinated to place the swath door 32 and windrow chute 52 in their respective positions in coordinated, interdependent fashion. The actuation may be implemented in a way that it is done by control from an operator of the harvester. This feature allows minimal time to change the configuration of the harvester from a spreading operation to an operation in which straw is windrowed and chaff is spread laterally across the field. This enables significant increases in operator efficiency and harvesting effectiveness.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A crop residue management apparatus for flexible distribution of straw and chaff contained within the crop residue, said apparatus comprising:
    a pair of laterally spaced spreader devices for distributing a crop residue laterally;
    a duct, including a swath door having a pivotable connector such that the swath door is displaceable between a lower position in which the crop residue stream is directed to the spreader devices in a downward direction and an upper position in which straw is permitted to bypass the spreader devices;
    a windrow chute displaceable between a first position in which the windrow chute is out of the crop residue stream and a second lowered position in which it directs straw in the residue stream over an upper surface of the windrow chute in a windrow behind the apparatus and directs chaff laterally; and
    a linkage interconnecting the swath door with the windrow chute so that the movement of the swath door to its lower position raises the windrow chute out of the crop stream and displacement of the swath door to its upper position lowers the windrow chute to a position below the swath door and within the crop stream, the linkage comprising a pivoting bar assembly, wherein the windrow chute is mounted from a first portion of the bar assembly and a second portion of the bar assembly is movably coupled to the swath door below the pivotable connector of the swath door.

2. The apparatus of claim 1, wherein the swath door and windrow chute are pivotable about an axis.

3. The apparatus of claim 1, wherein the pivotal axis of the swath door and windrow chute extends laterally with respect to the crop residue stream flow.

4. The apparatus of claim 2, wherein the windrow chute is supported by bars extending on both sides that form a portion of the pivoting bar assembly.

5. The apparatus of claim 4, in which plates are secured to the bars and to a pivotal mounting.

6. The apparatus of claim 5, wherein the bars have an extension pivotally interconnected with the swath door.

7. A crop residue management apparatus for flexible distribution of straw and chaff contained within the crop residue, said apparatus comprising:
    a pair of laterally spaced spreader devices for distributing a crop residue laterally;
    a duct, including a swath door displaceable between a lower position in which the crop residue stream is directed to the spreader devices in a downward direction and an upper position in which straw is permitted to bypass the spreader devices;
    a windrow chute displaceable between a first position in which the windrow chute is out of the crop residue stream and a second position in which it directs straw in the residue stream in a windrow behind the apparatus and directs chaff laterally,; and
    a linkage interconnecting the swath door with the windrow chute so that the movement of the swath door to its lower position displaces the windrow chute out of the crop stream and displacement of the swath door to its upper position places-the windrow chute within the crop stream;
    wherein the swath door and windrow chute are pivotable about an axis;
    wherein the windrow chute is supported by bars extending on both sides, in which plates are secured to the bars and to a pivotal mounting;
    wherein the bars have an extension pivotally interconnected with the swath door:
    wherein the swath door has a pair of rollers for capturing the bars therebetween, said rollers being positioned adjacent the free end of the swath door for producing the pivotal movement.

8. The apparatus of claim 5, in which the bars have a pivotal interconnection so that both the swath door and windrow chute may be in an upper position during servicing.

9. The apparatus of claim 8 having additional plates pivotally interconnected to the first mentioned plates and to the bar extensions, the plates being interconnected by a strut having a first elongated position in which the bar extensions align with the first mentioned bars and a second, retracted position in which the plates are pivoted with respect to one another.

10. An agricultural combine including:
  a crop processing apparatus separating crop material from crop residue containing straw and chaff and for discharging crop residue therefrom in a stream;
  a duct for receiving the crop residue stream, said duct having a swath door connected to the combine by a pivotal connector for movement between a lower position in which the crop residue stream is directed in a downward direction and an upper position in which the straw is not directed in a downward direction;
  a pair of laterally spaced spreader devices for distributing crop residue laterally, said spreader devices being positioned below the swath door;
  a windrow chute displaceable between a first position in which the windrow chute is out of the crop residue stream and a second position in which it directs straw in the residue stream in a windrow behind the apparatus and directs chaff laterally; and
  linkage interconnecting the displacement of the swath door with the windrow chute to displace the windrow chute between its positions, the linkage comprising a pivoting bar assembly, wherein the windrow chute is mounted from a first portion of the bar assembly and a second portion of the bar assembly is movably coupled to the swath door below the pivotal connector the swath door, the linkage arranged such that the movement of the swath door to its lower position raises the windrow chute out of the crop stream and displacement of the swath door to its upper position lowers the windrow chute to a position below the swath door and within the crop stream.

11. The agricultural combine of claim 10, in which the swath door and windrow chute are pivotal about an axis fixed on the combine.

12. The agricultural combine of claim 11, in which the pivotal axis of the swath door and windrow chute are lateral to the direction of movement of the combine.

13. The agricultural combine of claim 11, wherein the windrow chute is supported by bars extending from both sides of the windrow chute in a forward direction.

14. The agricultural combine of claim 13, including plates secured to the bars and forming a pivotal connection with the combine frame.

15. The agricultural combine of claim 14, in which the bars have extensions pivotally interconnected to the swath door.

16. The agricultural combine of claim 15, in which the swath door has pairs of rollers for capturing the bar extensions therebetween to permit relative movement.

17. The agricultural combine of claim 16, in which the bars have a pivotal interconnection so that both the swath door and windrow chute may be in an upper position during servicing.

18. The agricultural combine of claim 16, having additional plates pivotally interconnected to the first mentioned plates and to the bar extensions, the plates being interconnected by a strut having a first elongated position in which the bar extensions align with the first mentioned bars and a second, retracted position in which the plates are pivoted with respect to one another.

* * * * *